United States Patent
Kimbrell (10) Patent No.: US 7,587,197 B2
(45) Date of Patent: Sep. 8, 2009

(54) METHOD AND SYSTEM FOR MAINTAINING ANONYMITY OF A MOBILE RADIO TERMINAL

(75) Inventor: Jacob W. Kimbrell, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 571 days.

(21) Appl. No.: 11/385,450

(22) Filed: Mar. 21, 2006

(65) Prior Publication Data
US 2007/0224998 A1 Sep. 27, 2007

(51) Int. Cl.
*H04M 1/68* (2006.01)
(52) U.S. Cl. .................. 455/410; 455/406; 455/411; 705/74; 705/75; 705/78
(58) Field of Classification Search ......... 455/418–420, 455/445, 410, 411, 414.1, 415, 417, 432.2, 455/432.3, 433, 406, 407
See application file for complete search history.

(56) References Cited

U.S. PATENT DOCUMENTS

| | | | |
|---|---|---|---|
| 6,654,607 B1 * | 11/2003 | Shobatake et al. | 455/433 |
| 6,662,006 B2 * | 12/2003 | Glass | 455/415 |
| 6,938,022 B1 * | 8/2005 | Singhal | 705/74 |
| 6,965,594 B2 * | 11/2005 | Boyd et al. | 370/352 |
| 7,113,803 B2 * | 9/2006 | Dehlin | 455/466 |
| 7,185,091 B2 * | 2/2007 | Dorenbosch et al. | 709/224 |
| 2003/0009593 A1 | 1/2003 | Apte | |
| 2003/0063735 A1 | 4/2003 | Brockenbrough et al. | |
| 2004/0193685 A1 | 9/2004 | Proehl | |
| 2004/0203619 A1 | 10/2004 | Tissot | |
| 2004/0215824 A1 | 10/2004 | Payrits | |

FOREIGN PATENT DOCUMENTS

EP 1 335 558 A1 8/2003

\* cited by examiner

*Primary Examiner*—CongVan Tran
(74) *Attorney, Agent, or Firm*—Renner, Otto, Boisselle & Sklar, LLP (57) ABSTRACT

A method and system to allowing a user to maintain the privacy of his or her telephone number. The method and system provide a way in which another party may transmit data to the mobile telephone of the user without knowing the phone number associated with the destination mobile telephone. In addition, the method and system provide a way for the user to transmit data from his or her mobile telephone without revealing the phone number associated with the mobile telephone.

8 Claims, 3 Drawing Sheets

METHOD AND SYSTEM FOR MAINTAINING ANONYMITY OF A MOBILE RADIO TERMINAL

TECHNICAL FIELD OF THE INVENTION

The present invention relates generally to electronic equipment, such as mobile electronic equipment for engaging in voice communications. More particularly, the invention relates to a method and system for maintaining the anonymity of a mobile electronic equipment when engaged in the exchange of messages or data with another device.

DESCRIPTION OF THE RELATED ART

Mobile and/or wireless items of electronic equipment are becoming increasingly popular. For example, mobile telephones are now in wide-spread use. In addition, the features associated with certain types of electronic equipment have become increasingly diverse. To name a few examples, many electronic equipment include cameras, text messaging capability, Internet browsing functionality, electronic mail capability, video playback capability, audio playback capability, image display capability and hands-free headset interfaces.

In order to uniquely identify mobile telephones, each mobile telephone is associated with a telephone number. The telephone number of a particular mobile telephone may be dialed to invoke a call to that mobile telephone. As such, the calling party must know the telephone number of the mobile telephone of interest to make a call to that mobile telephone.

In addition to making and receiving telephone calls, data may be transmitted from and received by many mobile telephones. Data is often transmitted in the form of a message, such as in a short message service (SMS) format or a multimedia messaging service (MMS) format. As is conventional, to transmit data or a message to a mobile telephone, the telephone number of the mobile telephone of interest must be known by the transmitting device to identify the destination mobile telephone.

Some users of mobile telephones may not be interested in widely disseminating the telephone number of their mobile telephone. For instance, a user may give the telephone number of his or her mobile telephone to close friends and family, but may be uninterested in sharing the telephone number with commercial establishments or other individuals. At the same time, the user may periodically have a desire to receive data from a party to whom the user would not otherwise be inclined to provide his or her telephone number. In these situations, the user is forced to decide between providing his or her telephone number and foregoing receipt of desired data. Furthermore, if the user desires to transmit data using conventional techniques to another mobile telephone, the telephone number of the user's mobile telephone may become known to the recipient of the data.

SUMMARY

Aspects of the present invention are directed to allowing a user to maintain the privacy of his or her telephone number, but provide a way in which another party may transmit data to the mobile telephone of the user without knowing the phone number associated with the destination mobile telephone and/or provide a way for the user to transmit data from his or her mobile telephone without revealing the phone number associated with the mobile telephone.

According to one aspect of the invention, a method of transmitting data from a data source to a mobile radio terminal while maintaining anonymity of a telephone number of the mobile radio terminal includes sending a request for connection data of the mobile radio terminal to a trusted intermediary, the request identifying the mobile radio terminal by an alias registered with the trusted intermediary by a user of the mobile radio terminal; receiving connection data transmitted from the trusted intermediary to the data source, the connection data including a telephone number of the mobile radio terminal; maintaining the telephone number of the mobile radio terminal in a form that is inaccessible to the user of the data source; and transmitting the data using the telephone number to indicate the mobile radio terminal as a destination of the data to a communications network.

According to another aspect, the telephone number is received by the data source in an encrypted format and is decrypted to transmit the data.

According to another aspect, the connection data received by the data source includes one or more permissions and the method further includes validating that the data source satisfies the one or more permissions before transmitting the data.

According to another aspect, the method further includes storing the communication data with the data source as a contact for which the alias is viewable and the telephone number is not viewable.

According to another aspect of the invention, a mobile radio terminal is configured to transmit data to a data destination while maintaining anonymity of a telephone number of the data destination and includes a radio circuit for sending signals to and receiving signals from a communications network; and an alias processing function that: generates a request for connection data of the data destination and controls the radio circuit to send the request to a trusted intermediary, the request identifying the data destination an alias registered with the trusted intermediary by a user of the data destination; processes connection data received from the trusted intermediary, the connection data including a telephone number of the data destination; maintains the telephone number of the data destination in a form that is inaccessible to the user of the mobile radio terminal; and controls the radio circuit to transmit the data using the telephone number to indicate the data destination as a destination of the data to the communications network.

According to another aspect of the invention, a program stored on a machine usable medium includes an alias processing function executable by a mobile radio terminal that transmits data to a data destination and is configured to maintain anonymity of a telephone number of the data destination. The program includes executable logic to generate a request for connection data of the data destination for transmission to a trusted intermediary, the request identifying the data destination by an alias registered with the trusted intermediary by a user of the data destination; process connection data received from the trusted intermediary, the connection data including the telephone number of the data destination; maintain the telephone number of the data destination in a form that is inaccessible to the user of the mobile radio terminal; and control the transmission of the data using the telephone number to indicate the data destination as a destination of the data to a communications network.

According to another aspect of the invention, a method of receiving data transmitted by a data source with a mobile radio terminal while maintaining anonymity of a telephone number of the data source includes receiving data from the data source, the data including the telephone number of the data source; and maintaining the telephone number of the data source in a form that is inaccessible to the user of the mobile radio terminal.

According to another aspect, the method further includes registering an alias for the mobile radio terminal with a trusted intermediary with which the data source may request connection data for the mobile radio terminal; and communicating the alias for the mobile radio terminal to the data source.

According to another aspect, the registering associates one or more permissions with the alias for which the data source must satisfy before the trusted intermediary transmits the connection data corresponding to the mobile radio terminal to the data source.

According to another aspect, the received data includes an identification of the data source by an alias.

According to another aspect, the method further includes storing the alias and telephone number of the data source as a contact for which the alias is viewable and the telephone number is not viewable.

According to another aspect, the telephone number is encrypted.

According to another aspect of the invention, a mobile radio terminal is configured to receive data from a data source while maintaining anonymity of a telephone number of the data source and includes a radio circuit for sending signals to and receiving signals from a communications network including receiving data from the data source, the data including the telephone number of the data source; and an alias processing function that maintains the telephone number of the data source in a form that is inaccessible to the user of the mobile radio terminal.

According to another aspect, the alias processing function is configured to register an alias for the mobile radio terminal with a trusted intermediary with which the data source may request connection data for the mobile radio terminal.

According to another aspect of the invention, a program stored on a machine usable medium includes an alias processing function executable by a mobile radio terminal that receives data from a data source and is configured to maintain anonymity of a telephone number of the data source. The program includes executable logic to process data received from the data source, the data including the telephone number of the data source; and maintain the telephone number of the data source in a form that is inaccessible to the user of the mobile radio terminal.

According to another aspect, the program further includes logic to register an alias for the mobile radio terminal with a trusted intermediary with which the data source may request connection data for the mobile radio terminal.

According to another aspect of the invention, a method of facilitating a transmission of data from a data source to a mobile radio terminal having a telephone number while maintaining anonymity of the telephone number to a user of the data source includes registering an alias for the mobile radio terminal with a trusted intermediary; receiving a request from the data source with the trusted intermediary for communication data of the mobile radio terminal, the request identifying the mobile radio terminal by the alias; and transmitting the connection data for the mobile radio terminal to the data source, the communication data including the telephone number of the mobile radio terminal in a format that is inaccessible by the user of the data source.

According to another aspect, the registering associates one or more permissions with the alias for which the data source must satisfy before the trusted intermediary transmits the connection data.

According to another aspect of the invention, a trusted intermediary that forms part of a communications network for supporting communications with a mobile radio terminal includes a trusted intermediary function that registers an alias for the mobile radio terminal; receives a request from the data source for communication data of the mobile radio terminal, the request identifying the mobile radio terminal by the alias; and transmits the connection data for the mobile radio terminal to the data source, the communication data including the telephone number of the mobile radio terminal in a format that is inaccessible by the user of the data source.

According to another aspect of the invention, a program stored on a machine usable medium includes a trusted intermediary function executable by a trusted intermediary that forms part of a communications network for supporting communications with a mobile radio terminal. The program includes executable logic to register an alias for the mobile radio terminal; receive a request from the data source for communication data of the mobile radio terminal, the request identifying the mobile radio terminal by the alias; and transmit the connection data for the mobile radio terminal to the data source, the communication data including the telephone number of the mobile radio terminal in a format that is inaccessible by the user of the data source.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

The present invention will now be described with reference to the drawings, wherein like reference numerals are used to refer to like elements throughout.

The term "electronic equipment" includes portable radio communication equipment. The term "portable radio communication equipment," which herein after is referred to as a "mobile radio terminal," includes all equipment such as mobile telephones, pagers, communicators, i.e., electronic organizers, personal digital assistants (PDAs), smartphones, portable communication apparatus or the like.

In the present application, the invention is described primarily in the context of a mobile telephone, which also may be referred to as a mobile station. However, it will be appreciated that the invention is not intended to be limited to a mobile telephone and can be any type of electronic equipment.

Figure 1:
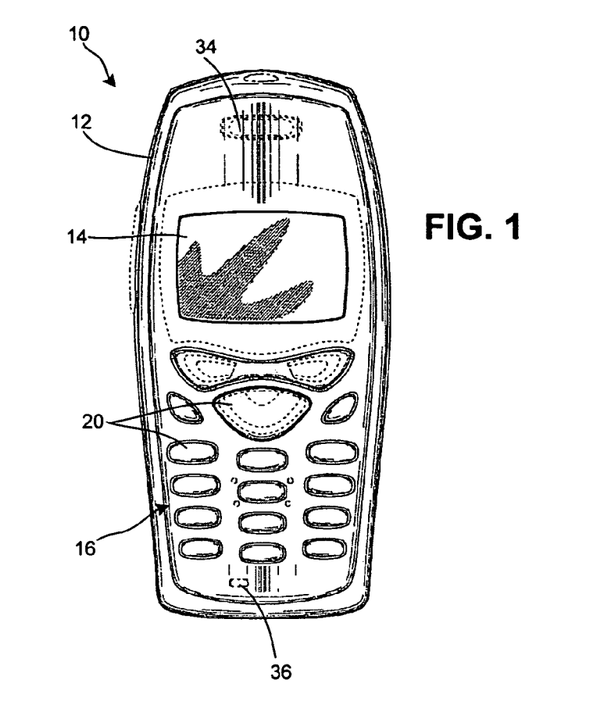
FIG. 1 is a schematic view of a mobile telephone as an exemplary electronic equipment in accordance with an embodiment of the present invention.

Referring initially to FIG. 1, an electronic equipment 10 is shown in accordance with the present invention. The electronic equipment includes an alias processing function that is configured to assist in protecting a telephone number associated with the electronic equipment 10. It will be appreciated that the alias processing function may be embodied as executable code that may be resident in the electronic equipment 10.

The electronic equipment in the exemplary embodiment is a mobile telephone and will be referred to as the mobile telephone 10. The mobile telephone 10 is shown as having a "brick" or "block" form factor housing 12, but it will be appreciated that other type housings, such as a clamshell housing or a slide-type housing, may be utilized without departing from the scope of the invention.

The mobile telephone 10 includes a display 14 and keypad 16. As is conventional, the display 14 displays information to a user such as operating state, time, telephone numbers, contact information, various navigational menus, etc., which enable the user to utilize the various feature of the mobile telephone 10. The display 14 may also be used to visually display content received by the mobile telephone 10 and/or retrieved from a memory 18 (FIG. 2) of the mobile telephone 10.

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys such as a "call send" key for initiating or answering a call, and a "call end" key for ending, or "hanging up" a call. Special function keys may also include menu navigation keys, for example, for navigating through a menu displayed on the display 14 to select different telephone functions, profiles, settings, etc., as is conventional. Other keys associated with the mobile telephone may include a volume key, audio mute key, an on/off power key, a web browser launch key, a camera key, etc. Keys or key-like functionality may also be embodied as a touch screen associated with the display 14.

The mobile telephone 10 includes conventional call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc.

Figure 2:
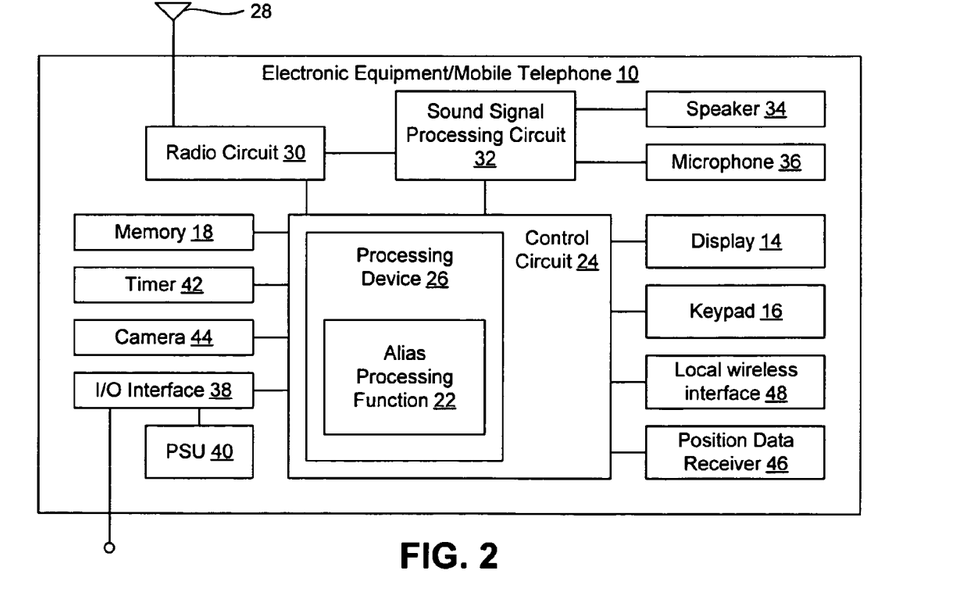
FIG. 2 is a schematic block diagram of the relevant portions of the mobile telephone of FIG. 1 in accordance with an embodiment of the present invention.

FIG. 2 represents a functional block diagram of the mobile telephone 10. With the exception of an alias processing function 22 according to the present invention, which is preferably implemented as executable logic in the form of application software or code within the mobile telephone 10, the construction of the mobile telephone 10 is otherwise generally conventional. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out conventional operation of the mobile telephone 10. The memory 18 may be, for example, one or more of a buffer, a flash memory, a hard drive, a removable media, a volatile memory, a non-volatile memory or other suitable device. In addition, the processing device 26 executes code in accordance with the present invention in order to perform the alias processing function 22.

It will be apparent to a person having ordinary skill in the art of computer programming, and specifically in applications programming for mobile telephones or other items of electronic equipment, how to program a mobile telephone 10 to operate and carry out the functions described herein. Accordingly, details as to the specific programming code have been left out for sake of brevity. Also, while the alias processing function 22 is executed by the processing device 26 in accordance with the preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system The mobile telephone 10 further includes a sound signal processing circuit 32 for processing audio signals transmitted by/received from the radio circuit 30. Coupled to the sound processing circuit 32 are a speaker 34 and a microphone 36 that enable a user to listen and speak via the mobile telephone 10 as is conventional. The radio circuit 30 and sound processing circuit 32 are each coupled to the control circuit 24 so as to carry out overall operation.

The mobile telephone 10 also includes the aforementioned display 14 and keypad 16 coupled to the control circuit 24. A video decoder (not shown) may be used to convert video data received by the radio circuit 30 or retrieved from a file stored by the memory 18 in to a video signal used to drive the display 14. The mobile telephone may further include any appropriate video and/or audio buffers for buffering video and/or audio data.

The mobile telephone 10 further includes one or more I/O interface(s) 38. The I/O interface(s) 38 may be in the form of typical mobile telephone I/O interfaces and may include one or more electrical connectors. As is typical, the I/O interface(s) 38 may be used to couple the mobile telephone 10 to a battery charger to charge a battery of a power supply unit (PSU) 40 within the mobile telephone 10. In addition, or in the alternative, the I/O interface(s) 38 may serve to connect the mobile telephone 10 to a wired personal hands-free adaptor (not shown). Further, the I/O interface(s) 38 may serve to connect the mobile telephone 10 to a personal computer or other device via a data cable or wireless link, etc. The mobile telephone 10 may receive operating power via the I/O interface(s) 38 when connected to a vehicle power adapter or an electricity outlet power adapter.

The mobile telephone 10 may also include a timer 42 for carrying out timing functions. Such functions may include timing the durations of calls, generating the content of time and date stamps, etc. The mobile telephone 10 may include a camera 44 for taking digital pictures and/or movies. Image and/or video files corresponding to the pictures and/or movies may be stored in the memory 18. The mobile telephone 10 also may include a position data receiver 46, such as a global positioning system (GPS) receiver, Galileo satellite system receiver or the like. The mobile telephone 10 also may include a local wireless interface 48, such as an infrared transceiver and/or a Bluetooth adaptor, for establishing communication with an accessory, hands-free adaptor, computer or other device.

As indicated, the mobile telephone 10 may be configured to transmit, receive and process data, such as text messages (e.g., an SMS), electronic mail messages, multimedia messages (e.g., an MMS), image files, video files, audio files, ring tones, streaming audio, streaming video and so forth. Processing such data may include storing the data in the memory 18, executing applications to allow user interaction with data, displaying video and/or image content associated with the data and so forth.

Figure 3:
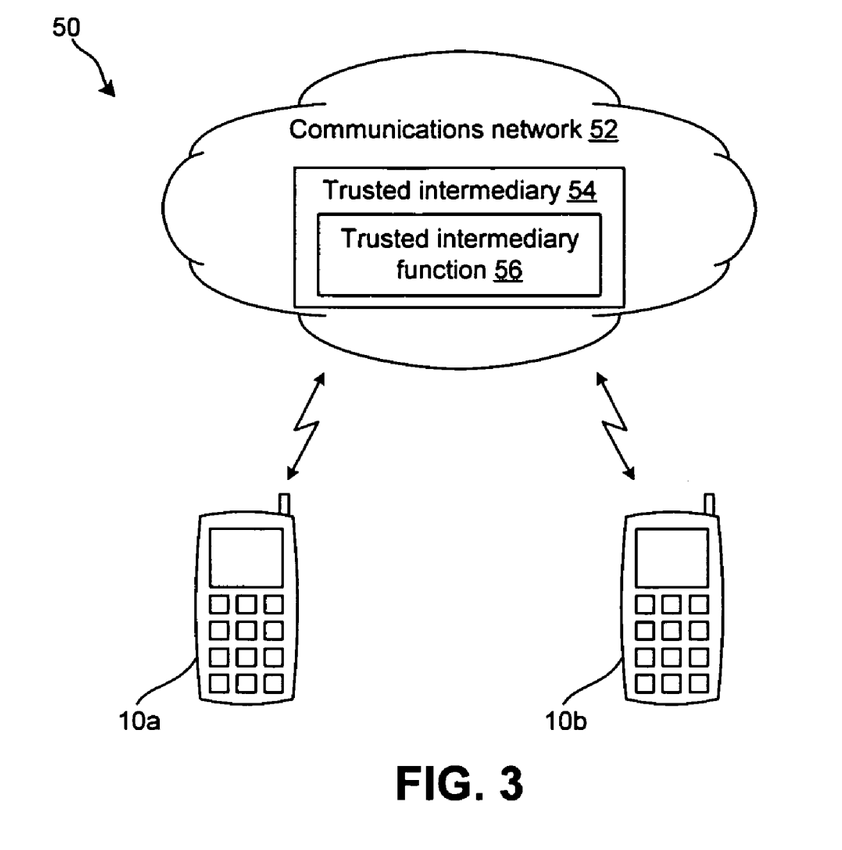
FIG. 3 is a schematic diagram of a communications system in which the mobile telephone of FIG. 1 may operate.

With additional reference to FIG. 3, the mobile telephone 10 may be configured to operate as part of a communications system 50. The system 50 may include a communications network 52 having a server or servers (not shown) for managing calls placed by and destined to the mobile telephone 10, transmitting data to the mobile telephone 10 and carrying out any other support functions. The server communicates with the mobile telephone 10 via a transmission medium. The transmission medium may be any appropriate device or assembly, including, for example, a communications tower, another mobile telephone, a wireless access point, a satellite, etc. Portions of the network may include wireless transmission pathways.

The network 52 may support the communications activity of multiple mobile telephones 10. In the illustration of FIG. 3, two mobile telephones 10 are illustrated as part of the system 50. For the purposes of the description herein, these mobile telephones 10 will be referred to as a first mobile telephone 10a (or mobile telephone A) and a second mobile telephone 10b (or mobile telephone B).

In an example description of the operation of aspects of the present invention that follows, mobile telephone B transmits data to mobile telephone A in a scheme where the underlying identity of the mobile telephones 10 remain anonymous to the users of the other mobile telephone 10. The underlying identity of the mobile telephone 10 may include data such as the telephone number associated with mobile telephone 10, the name of the user of the mobile telephone 10 and so forth.

In the illustrated embodiment, each of mobile telephone 10a and 10b are configured to include the alias processing function 22. It will be appreciated, however, that the transmitter or receiver of data in accordance with the present invention need not be a mobile telephone and/or need not include all or part of the alias process function 22. For example, the transmitter or receiver of data may be a voice over Internet protocol (VoIP) telephone, a server, a computing device or other suitable device instead of the exemplary mobile telephone 10a or 10b. Accordingly, the transmitter of data may be referred to as a data source and the receiver of data may be referred to as a data destination.

In one embodiment, the network 52 includes a trusted intermediary 54. The trusted intermediary 54 may be a server, which may operate in stand alone configuration relative to other servers of the network 52 or may be configured to carry out the trusted intermediary functions described herein in combination with other functions. In one embodiment, the trusted intermediary 54 may carry out the functions of a home location register (HLR) that manages data associated with each mobile telephone 10 in the system 50, such as telephone number, user name or account information, cell identifier currently servicing the mobile telephone 10, etc.

As will be appreciated, the trusted intermediary 54 may include a processor configured to execute software containing logical instructions that embody the functions of the trusted intermediary 54 described herein. Those functions may be complimentary to the operation of the alias processing function 22 of the mobile telephone(s) 10, and will be collectively referred to as a trusted intermediary function 56.

Figure 4:
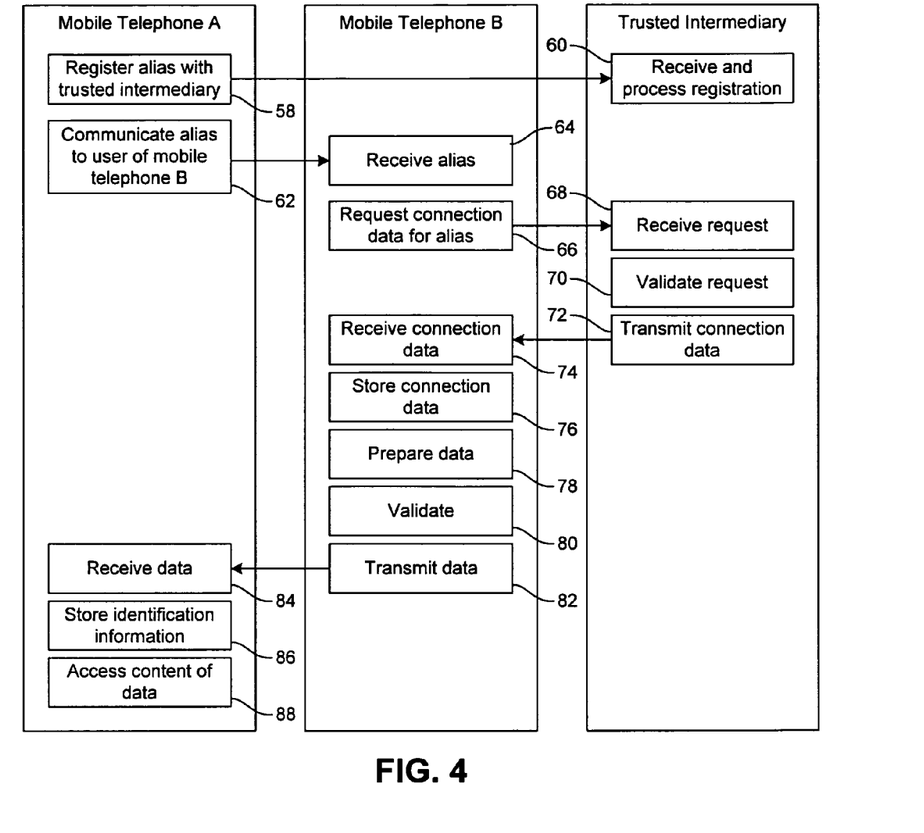
FIG. 4 is a diagram showing an exemplary anonymous data exchange scheme carried out by components of the communications system in accordance with an embodiment of the present invention.

With additional reference to FIG. 4, shown is an exemplary anonymous data exchange scheme carried out by components of the communications system 50. The diagram of FIG. 4 shows functional blocks carried out by one of the first mobile telephone 10a (mobile telephone A), the second mobile telephone 10b (mobile telephone B) or the trusted intermediary 54. While not in flow chart format, the functional blocks represented in FIG. 4 may be thought of as depicting steps in a method. As will be appreciated, the illustrated functional blocks may be embodied as software resident in and executed by a corresponding one of the first mobile telephone 10a, the second mobile telephone 10b and/or the trusted intermediary 54.

In the example of FIG. 4, the user of the first mobile telephone 10a does not wish to disclose the telephone number of the first mobile telephone 10a to the user of the second mobile telephone 10b, but is willing to receive data from the second mobile telephone 10b. In the example, the user of the second mobile telephone 10b may wish to not disclose the telephone number of the second mobile telephone 10b to the user of the first mobile telephone 10a. The second mobile telephone 10b will be considered the data source for purposes of the example and the first mobile telephone 10a will be considered the data destination for purposes of the example. As will become apparent, the underlying identity of the mobile telephones 10 in terms of telephone number and/or user name may remain anonymous to each other while allowing a transfer of data. As will be appreciated, the techniques described herein may be modified so that that the identity (e.g., telephone number) of one of the mobile telephones 10 may be used in place of an alias as described below if one of the users is willing to disclose the underlying identity of his or her mobile telephone 10.

The user of the second mobile telephone 10b may be a person known to the user of the first mobile telephone 10a, such as an acquaintance, business associate or the like. In other situations, the user of the mobile telephone 10b may be a commercial enterprise that may want to contact the user of the first mobile telephone 10a to send requested data, such as content purchased by the user (e.g., video files or audio files), a message indicating that an event has occurred (e.g., a restaurant is ready to seat the user), requested advertising information, and so forth. In yet other situations, the user of the mobile telephone 10b may be a commercial enterprise that may want to contact the user of the first mobile telephone 10a to deliver data that has not been requested, such as unsolicited advertisements.

A method of maintaining the anonymity of one or more of the mobile telephones 10 may begin in block 58 where the first mobile telephone 10a registers one or more aliases with the trusted intermediary 54. An alias for the first mobile telephone 10a may be any assumed name (e.g., "handle") selected by the user. The alias will typically be an alphanumeric string of characters, such as "John23" or "dizzybird."

The alias may be associated with one or more permissions. A permission may be used to restrict how others (e.g., the second mobile telephone 10b) may use the alias. An example permission may be a restriction on the number of connections that may be made to the mobile telephone 10a using the alias so as to limit the number of times that data may be transmitted to the mobile telephone 10a under the alias (e.g., once, five times, ten times, etc.). Another example permission may be a restriction on the identity of the data source, or device transmitting the data. For instance, an alias may be used by only selected data sources or, in another embodiment, an alias may be used by any data source except specified sources. Another example permission may be a restriction on how long data may be transmitted to the mobile telephone 10a under the alias (e.g., the alias may be configured to expire after a selected number of hours, days or weeks). Another example permission may be a prohibition on retransmitting the alias from a data source to other devices. Another example permission may be a restriction on the type of content that may be transmitted. For instance, a commercial establishment may send notifications regarding new products and coupons for special promotions. The user may select to receive neither notifications nor coupons, both notifications and coupons, or just one of the content types. Permissions may be set by the user of the mobile telephone 10a using, for example, a graphical user interface with various appropriate options and menu selections.

Multiple aliases for the first mobile telephone 10a may be registered with the trusted intermediary 54 and each alias may have a different set of permissions. Multiple aliases with different permissions may allow the user of the first mobile telephone 10a to use different aliases for different types of data sources and/or users of the data sources.

The registration of block 58 may take the form of transmitting a registration request from the mobile telephone 10a to the trusted intermediary 54. The request may be in the form of an SMS or MMS, for example. In block 60, the trusted intermediary 54 may receive and process the registration request. Processing the request may include, for example, storing the alias in a database along with any associated permissions. Although not illustrated, the user of the first mobile telephone 10a may have the option to cancel the alias so that no parties may use the alias to transmit data to the first mobile telephone 10a.

The second mobile telephone 10b may similarly register an alias or aliases for the second mobile telephone 10b with the trusted intermediary.

In block 62, the user of first mobile telephone 10a may disclose to the user of the second mobile telephone 10b the alias that is now (or will be) registered by the trusted intermediary 54 in association with the first mobile telephone 10a. For example, the user of the first mobile telephone 10a may orally communicate the alias to the user of the second mobile telephone 10b during an in person conversation or during a telephone conversation (which may or may not include use of the mobile telephones 10a and 10b). Communication of the alias may be made in electronic form, such as by transmitting the alias from the first mobile telephone 10a to the second mobile telephone 10b using, for example, a text message or electronic mail message, provided the user of the first mobile telephone 10a has sufficient contact information (e.g., telephone number or alias) for the second mobile telephone 10b. Another form of electronic communication may be in the form of completing an electronic form, such as a data collection page of an Internet website of the user of the second mobile telephone 10b. The alias is received by the user of the second mobile telephone 10b in block 64.

The alias provided to the user of the second mobile telephone will not be enough to transmit data to the first mobile telephone 10. Rather, the alias may be used to retrieve connection data for the first mobile telephone 10a from the trusted intermediary. The connection data may be an encrypted version of the telephone number for the first mobile telephone 10a or another version of the telephone number that the user of the second mobile telephone 10b cannot access. The second mobile telephone 10b may not have the capability to decrypt the connection data and/or view the connection data, thereby maintaining the anonymity of the underlying identity of the first mobile telephone 10a.

In block 66 the second mobile telephone 10b may send a request for the connection data of the first mobile telephone 10a to the trusted intermediary 54. The request may be in the form of an SMS or an MMS, for example. The request may identify the first mobile telephone 10a by the alias received in block 64. Upon receipt of the request in block 68, the trusted intermediary 54 may validate the request in block 70. For example, the trusted intermediary 54 may check to ensure that the user of the first mobile telephone 10a has not deactivated the alias and that the second mobile telephone 10b satisfies any relevant permissions associated with the alias.

If the request satisfies the permissions, the trusted intermediary 54 may transmit the connection data to the second mobile telephone 10b in block 72. The connection data may be transmitted in the form of an MMS, for example. As indicated, the connection data may include an encrypted or non-viewable version of the telephone number of the first mobile telephone 10b. The connection data may further include permissions to regulate how the second mobile telephone 10b may use the connection data. Example permissions associated with the connection data may be restrictions on the type of data that may be transmitted, when the data may be transmitted (e.g., windows of time, such as during business hours, an expiration for the connection data, etc.), the number of times data may be transmitted, a limitation on the retransmission of the connection data, and so on. The connection data may be received by the second mobile telephone 10b in block 74.

In another embodiment, connection data may be received by the second mobile telephone 10b from a source other than the trusted intermediary 54. For example, the connection data may be transmitted from the first mobile telephone 10a to the second mobile telephone 10b using any appropriate interface, such a local wireless interface (e.g., Bluetooth, infrared link, IEEE 802.11 interface, etc.) or a connection over the network (e.g., in the form of an MMS).

After receiving the connection data, the second mobile telephone 10b may store the connection data in block 76. For example, the connection data may be stored as a contact in a contact list or database where the user may view the alias associated with the contact data, but may not view or otherwise make use of any restricted data such as the telephone number and/or user name of the first mobile telephone 10a. Thus, the restricted data is maintained in a form by the second mobile telephone 10b that is inaccessible to the user of the second mobile telephone 10b.

Thereafter, in block 78, the user of the second mobile telephone 10a may prepare data to be sent to the first mobile telephone 10a using the alias. The data may be placed in any suitable format, examples of which include an electronic mail message, a file, an MMS and so forth. The content of the data may be a text file, an electronic mail message, a multimedia message, an image file (e.g., a photograph), a video file, an audio file, a ring tone, streaming video, streaming audio, and so forth. The destination for the data specified by the user of the second mobile telephone 10b may be the alias for the first mobile telephone 10a.

Next, in block 80, any permissions associated with the alias may be verified. If the permissions indicate that the data may not be transmitted to the first mobile telephone 10a, no transmission of the data may occur. If the permissions are satisfied, transmission of the data may be made in block 82. The data may be transmitted by the second mobile telephone 10b to an appropriate interface device of the communications network 52 (e.g., a communications tower) for deliver to the first mobile telephone 10a.

The transmission of the data may be made using standard protocols for the communication network 52. However, standard protocols for the communications network 52 are generally not configured to accept an alias or an encrypted telephone number as destination information. Accordingly, as part of the transmission of block 82, the alias processing function 22 of the second mobile telephone 10b may use the telephone number of the first mobile telephone 10a to address the transmission. In an embodiment where the telephone number is encrypted, the telephone number may be decrypted for this purpose. The telephone number, whether encrypted or not, is maintained in an inaccessible form to the user of the second mobile telephone 10b.

The data, after traversing the communication network 52, may be received by the first mobile telephone 10a in step 84.

Part of the transmission received by the first mobile telephone 10b may be identification information for the second mobile telephone 10b. For instance, an alias associated with the second mobile telephone 10b may form part of the transmission, which, upon receipt by the first mobile telephone 10a may be used by the first mobile telephone 10a to acquire connection data for the second mobile telephone 10b from the trusted intermediary 54. In another embodiment, the identification information may include the telephone number and/or user name of the second mobile telephone 10b in a format accessible by the user of the first mobile telephone 10a. In another embodiment, the identification information may include the telephone number and/or user name of the second mobile telephone 10b in a format that is not accessible by the user of the first mobile telephone 10a (e.g., an encrypted format), but may be used by the first mobile telephone 10a in the manner that the second mobile telephone 10b may use the user inaccessible connection data of the first mobile telephone 10a to transmit data back to the second mobile telephone 10b. The identification information may be associated with permissions that may restrict the use of the identification information by the first mobile telephone 10a.

The identification information of the second mobile telephone 10b may be extracted from the received transmission. In one embodiment, the identification information may be stored by the first mobile telephone 10b in block 86 as contact information. In an embodiment where the telephone number and/or other information associated with the second mobile telephone 10b is encrypted or configured to remain hidden from the user of the first mobile telephone 10a, the user of the first mobile telephone 10a may only have access to an alias associated with second mobile telephone 10b. Thus, restricted data used to identify the second mobile telephone 10b is maintained by the first mobile telephone 10a in a form that is inaccessible (e.g., unavailable and unusable) to the user of the first mobile telephone 10a.

The data may be handled in a manner appropriate for the data in block 88. For example, the content of the data may be accessed by the user, displayed, stored in the memory 18 (FIG. 2), and so forth.

As will be appreciated, in the forgoing method of maintaining the anonymity of the mobile telephones 10a and/or 10b, the telephone number associated with the mobile telephones 10 may take the form of an exchangeable encrypted telephone number. Using contact information that is not accessible by the users of the mobile telephones 10 will enable the users to transmit data to one another without revealing certain information, such as a telephone number. The data transmitted in the this manner may take any form.

For example, when using an MMS format transmission, the data may be text, image (e.g., a still picture), video and/or audio data. The exchanged data under the method may includes streaming video and/or audio data, in which case a user may be able to avoid revealing a telephone number for his or her mobile telephone when engaging in a telephone-based chat room or video room.

The functionality relating to maintaining the anonymity of one or more of the mobile telephones 10 may be embodied as the alias processing function 22 and/or as the trusted intermediary function 56. Such functionality and any corresponding functions of a remote device or server may be embodied in any suitable form, including software, firmware, dedicated circuit components, computer readable media, machine usable medium and so forth.

Although the illustrations appended hereto that show a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores, or messages may be added to the logical flow for purposes of enhanced utility, accounting, performance, measurement, troubleshooting, and the like. It is understood that all such variations are within the scope of the present invention.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of transmitting data from a data source to a mobile radio terminal while maintaining anonymity of a telephone number of the mobile radio terminal, comprising:

sending a request for connection data of the mobile radio terminal to a trusted intermediary, the request identifying the mobile radio terminal by an alias registered with the trusted intermediary by a user of the mobile radio terminal;

receiving connection data transmitted from the trusted intermediary to the data source, the connection data including a telephone number of the mobile radio terminal;

maintaining the telephone number of the mobile radio terminal in the data source and in a form that is inaccessible to the user of the data source; and transmitting the data using the telephone number to indicate the mobile radio terminal as a destination of the data to a communications network, wherein the data source is an initiator of a call, a message or a file transfer to the mobile radio terminal to transmit the data.

2. The method of claim 1, wherein the telephone number is received by the data source in an encrypted format and is decrypted to transmit the data.

3. The method of claim 1, wherein the connection data received by the data source includes one or more permissions and the method further includes validating that the data source satisfies the one or more permissions before transmitting the data.

4. The method of claim 1, further comprising storing the connection data with the data source as a contact for which the alias is viewable and the telephone number is not viewable.

5. A method of facilitating a transmission of data from a data source to a mobile radio terminal having a telephone number while maintaining anonymity of the telephone number to a user of the data source, comprising:
- registering an alias for the mobile radio terminal with a trusted intermediary;
- receiving a request from the data source with the trusted intermediary for connection data of the mobile radio terminal, the request identifying the mobile radio terminal by the alias; and
- transmitting the connection data for the mobile radio terminal to the data source, the connection data including the telephone number of the mobile radio terminal in a format that is inaccessible by the user of the data source, wherein the data source is an initiator of a call, a message or a file transfer to the mobile radio terminal to transmit the data.

6. The method of claim 5, wherein the registering associates one or more permissions with the alias for which the data source must satisfy before the trusted intermediary transmits the connection data.

7. A trusted intermediary that forms part of a communications network for supporting communications with a mobile radio terminal, comprising a trusted intermediary function that:
- registers an alias for the mobile radio terminal;
- receives a request from the data source for connection data of the mobile radio terminal, the request identifying the mobile radio terminal by the alias; and
- transmits the connection data for the mobile radio terminal to the data source, the connection data including the telephone number of the mobile radio terminal in a format that is inaccessible by the user of the data source, wherein the data source is an initiator of a call, a message or a file transfer to the mobile radio terminal to transmit the data.

8. A computer readable medium storing a program, the program including a trusted intermediary function executable by a trusted intermediary that forms part of a communications network for supporting communications with a mobile radio terminal, the program comprising executable logic to:
- register an alias for the mobile radio terminal;
- receive a request from the data source for connection data of the mobile radio terminal, the request identifying the mobile radio terminal by the alias; and
- transmit the connection data for the mobile radio terminal to the data source, the connection data including the telephone number of the mobile radio terminal in a format that is inaccessible by the user of the data source, wherein the data source is an initiator of a call, a message or a file transfer to the mobile radio terminal to transmit the data.

* * * * *

UNITED STATES PATENT AND TRADEMARK OFFICE
CERTIFICATE OF CORRECTION

PATENT NO. : 7,587,197 B2 Page 1 of 1
APPLICATION NO. : 11/385450
DATED : September 8, 2009
INVENTOR(S) : Jacob W. Kimbrell It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 742 days.

Signed and Sealed this

Twenty-first Day of September, 2010

David J. Kappos
*Director of the United States Patent and Trademark Office*